Nov. 9, 1971  D. M. HARVEY  3,618,499
CAMERA WITH COORDINATED APERTURE AND FOCUS
ADJUSTMENT MEANS

Filed April 4, 1969  2 Sheets-Sheet 1

DONALD M. HARVEY
INVENTOR.

BY James J. Wood
Robert W. Hampton
ATTORNEYS

Nov. 9, 1971  D. M. HARVEY  3,618,499
CAMERA WITH COORDINATED APERTURE AND FOCUS
ADJUSTMENT MEANS
Filed April 4, 1969  2 Sheets-Sheet 2

DONALD M. HARVEY
INVENTOR.

BY James J. Wood
Robert W. Hampton
ATTORNEYS

United States Patent Office 3,618,499
Patented Nov. 9, 1971

3,618,499
CAMERA WITH COORDINATED APERTURE AND FOCUS ADJUSTMENT MEANS
Donald M. Harvey, Webster, N.Y., assignor to Eastman Kodak Company, Rochester, N.Y.
Filed Apr. 4, 1969, Ser. No. 813,459
Int. Cl. G03b 3/00
U.S. Cl. 95—45          5 Claims

ABSTRACT OF THE DISCLOSURE

A camera having both focusing and lens aperture adjustments is provided with a coordinating mechanism for automatically varying the lens focus adjustment as a function of the lens aperture adjustment, so as to insure maximum depth of field. In a preferred embodiment of the invention, this mechanism is incorporated in a camera provided with an automatic rangefinder lens focusing system, so that when the traverse of the rangefinder fails to detect a subject at a close distance, the lens is then adjusted to its shortest hyperfocal setting compatible with the concurrent adjustment of lens aperture.

BACKGROUND OF THE INVENTION

Field of the invention

The present invention relates to cameras, and more particularly to means for automatically coordinating the focal distance and aperture adjustments of camera lens systems to provide maximum depth of field.

Description of the prior art

As is well known in the photographic art, the range of distance within which an object can be photographed with acceptable image sharpness is inherently related to the effective aperture of the camera lens. The depth of field parameter of the camera lens increases as the lens aperture is decreased. For example, a typical 44 mm. lens for use in a 35 mm. camera will have a depth of field from about 4 feet 5 inches to about 5 feet 9 inches when set to a focal distance of 5 feet with a lens aperture of $f3.2$, and a depth of field of about 3 feet 6 inches to 8 feet 10 inches at the same distance setting with a lens aperture of $f11$. Similarly, the hyperfocal range of the same lens, within which all distant objects will be in acceptably sharp focus, will vary between a range of about 39 feet 2 inches to infinity, when the lens is set to infinity with an aperture of $f3.2$, and range of about 5 feet 10 inches to infinity when the lens is set to 12 feet with an aperture of $f11$. Closing the lens aperture to $f11$ while the lens is set at infinity, however, will extend the hyperfocal range only to the extent that objects beyond about 11 feet 6 inches can be photographed with acceptable image sharpness. Accordingly, many cameras provided with adjustable focus lens systems and variable lens apertures, include a movable reference scale which indicates the depth of field of the lens system at different settings to enable the operator to choose the most appropriate combination of lens and shutter adjustments depending upon the nature and brightness of the scene and upon considerations relating to shutter speed. In less sophisticated cameras, however, the lens may be adjustable only to focal positions identified by terms such as "close-up," "group," and "scene," which are established on the basis of the maximum available lens opening, and therefore do not necessarily provide maximum depth of field when the lens aperture is adjusted to a smaller size.

In order to eliminate the necessity for manually adjusting the camera lens to different focal positions, automatic focusing mechanisms have been developed which automatically detect the distance to an object and adjust the lens focus accordingly. Such systems may operate on the principle of triangulation based on the angularity between a beam of light emitted from the camera and impinged on the object, and the line of sight along which the resulting illumination of the object is detected by a photoresponsive sensing element in the camera. Illustrative examples of such camera focusing systems are described in commonly assigned copending U.S. patent applications Ser. No. 554,072, now Pat. No. 3,357,484 entitled Automatic Focusing System, filed in the name of Allen G. Stimson on May 31, 1966; Ser. No. 559,633, now Pat. No. 3,442,193 entitled Automatic Focusing System, filed in the name of Armin B. Pagel on May 31, 1966, and Ser. No. 574,393, now Pat. No. 3,443,502 entitled Automatic Focusing for Cameras, filed in the name of Donald M. Harvey on Aug. 23, 1966.

In a camera of the type described in the above-identified patent applications, the objective lens may gradually move rearwardly toward the camera film as the rangefinder system searches for an object in alignment with the camera lens at progressively increasing distances corresponding with the concurrent focusing adjustments of the lens. As soon as the object is detected, movement of the lens is arrested, so that the object is in sharp focus in approximately the middle of the depth of field range of the lens at the setting. If the rangefinder fails to detect an object in its field of view, the lens continues to move rearwardly to a predetermined hyperfocal position at which it then remains while the film is exposed. This hyperfocal position of the lens, however, is based on the assumption that the lens aperture is adjusted to its maximum opening, even though such a camera would almost invariably embody a photoresponsive exposure control system adapted to adjust the aperture size automatically as a function of scene brightness. Therefore, if a camera had a lens aperture setting of $f3.2$ as in the example above, the lens would be set automatically to a setting at which it could not produce a sharp photograph of an object closer than about 39 feet, this, regardless of the fact that the same lens could produce a sharp photograph of an object anywhere beyond about 5 feet 10 inches if it were set to a distance of 12 feet with the exposure aperture reduced to $f11$. Consequently, under conditions of relatively bright scene illumination, the automatic adjustment of the camera lens to its most distant hyperfocal setting obviously produces a much more limited depth of field than is otherwise necessary. Furthermore, this limitation in field depth at the most distant lens setting is particularly undesirable in cameras employing such automatic range finding systems because of the fact that the accuracy of that type of system decreases with increasing range, and also with increased levels of scene brightness. More particularly, since the rangefinder relies on detecting the impingement of a beam of light on the object to be photographed, an increase in ambient illumination decreases the relative intensity of the illumination signal detected by the rangefinder. Therefore, in direct contradiction to predicating the hyperfocal lens setting on the maximum lens aperture, it is especially desirable in such cameras that the failure of the rangefinder to detect an object at a close distance should result in the lens being set at its closest hyperfocal distance setting compatible with the adjustment of the lens aperture.

SUMMARY OF THE INVENTION

In accordance with the present invention, a camera including means for adjusting both the aperture and focus of its objective lens is provided with a mechanism for automatically regulating the focus adjustment of the lens as a function of the lens aperture adjustment to provide maximum depth of field. In a preferred embodiment of the invention, such a mechanism is incorporated in a camera provided with an automatic rangefinder system so that failure of the rangefinder to detect an object at a close distance causes the lens to be adjusted to its closest hyperfocal setting compatible with the concurrent adjustment of the lens aperture. Briefly, this is accomplished in accordance with an embodiment of the invention by means of a stop member which is positioned as a function of scene brightness by the same element of the automatic exposure control systems that adjust the lens aperture, whereby the stop member blocks rearward focusing movement of the lens when the latter reaches its closest hyperfocal distance setting compatible with the concurrent adjustment of the lens aperture.

The novel features of the invention are set forth with particularity in the appended claims. The invention itself, however, both as to its organization and method of operation together with further objects and advantages thereof, may best be understood by reference to the description to follow considered in connection with the accompanying drawings.

DESCRIPTION OF THE ILLUSTRATIVE PREFERRED EMBODIMENTS

Figures 1, 2:
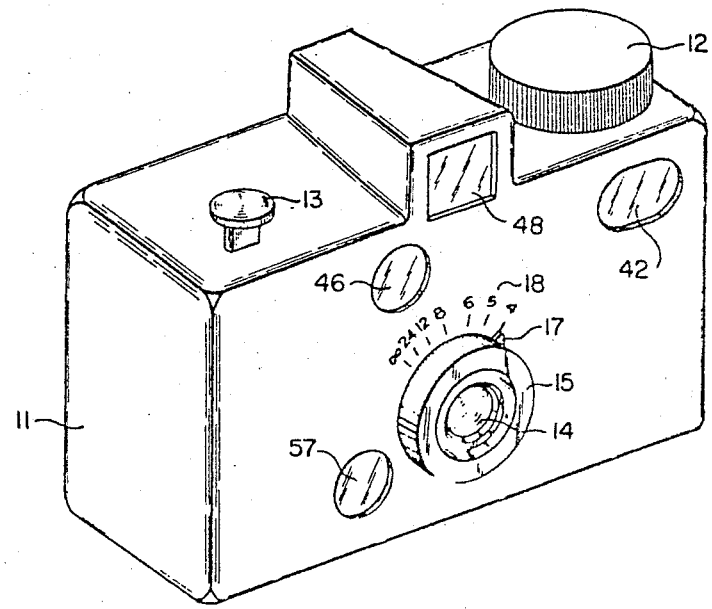
FIG. 1 is a perspective view of a camera utilizing the automatic rangefinder and lens focusing mechanism in accordance with the present invention.
FIG. 2 is a perspective schematic view of the automatic rangefinder and lens focusing mechanism utilized with the camera shown in FIG. 1.

One embodiment of the invention will be described and illustrated in connection with a still camera. Referring now to FIG. 1, the camera comprises a housing 11, provided with a film winding knob 12, a shutter operating member 13, and an objective lens 14 carried by a lens support member 15 and adapted to form an image of an object in a primary image plane. As is well known in the camera art, the lens support member 15 may be rotatably supported by a threaded sleeve partially visible at 16 in FIG. 2, so that upon rotation, the support member 15 carries the lens 14 forwardly or rearwardly along a predetermined path to change the focal distance setting; the magnitude of the adjustment is visibly displayed by the alignment of pointer 17 with a distance scale 18 on the camera housing.

Figure 3:
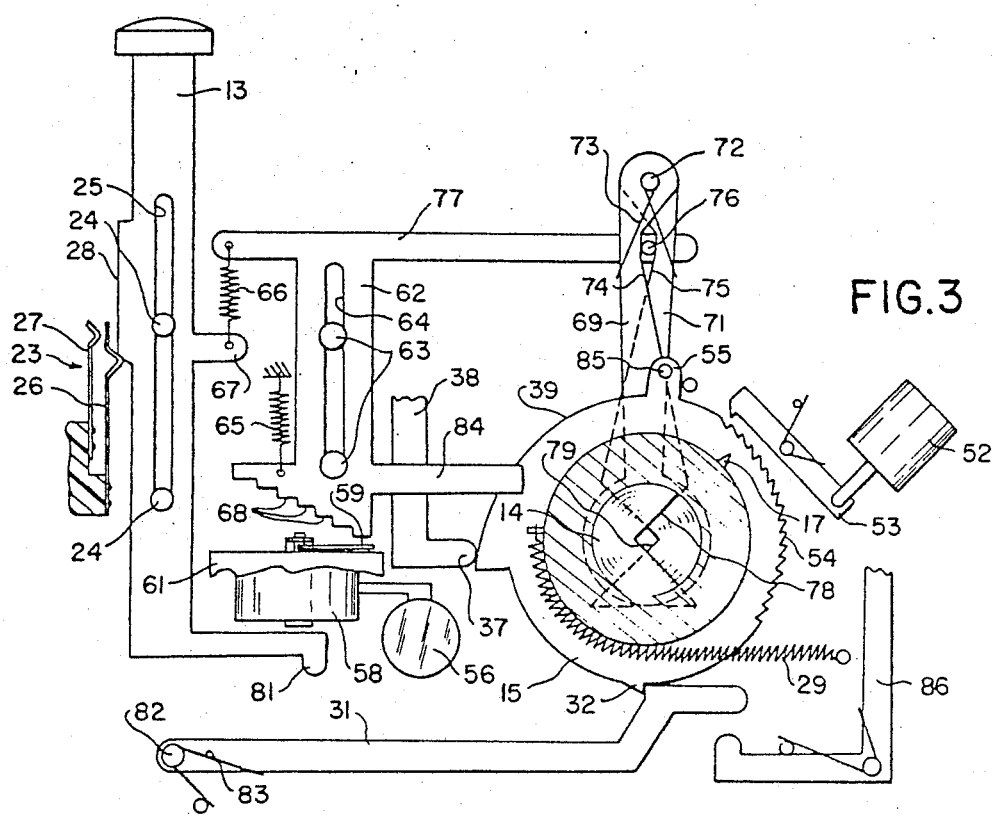
FIG. 3 is a schematic partial front view of the camera according to FIGS. 1 and 2, in accordance with a preferred embodiment of the present invention for coordinating the focus adjustment of the camera lens with the adjustment of the lens aperture.

The illustrative automatic rangefinder mechanism of the camera is depicted schematically in FIG. 2, and comprises a battery 19 connected in series with a lamp 21, an oscillator or chopper unit 22 and a normally open switch 23. As shown in FIG. 3, the shutter operating member 13 is slidably supported for vertical displacement by means of support studs 24 extending through a slot 25. The switch 23 comprises two flexible contact strips 26 and 27 supported adjacent a raised cam surface 28 situated on the shutter operating member 13, so that the initial downward movement of the latter moves strip 26 into electrical contact with strip 27 to close the switch 23. Accordingly, lamp 21 is energized, and continues to emit pulsating light until the shutter operating member 13 subsequently returns to its raised position.

Lens support member 15 is held in the position depicted in FIGS. 2 and 3 by a latch arm 31 held in locking engagement with latch tooth 32 by means of a spring 29. Before each operation of the shutter operating member 13, lens support member 15 is rotated in a clockwise direction against the biasing opposition of the spring 29. This rotational movement of the lens support member 15 may be effected in response to manual rotation of winding knob 12 or in response to operation of an automatic film advancing mechanism. In this position, the lens 14 is moved forwardly to its shortest focal range, which for the illustrative camera is about 4 feet as indicated on distance scale 18.

A slide plate 33 is supported for lateral sliding displacement by means of studs 34 extending through a longitudinal slot 35, and is biased to the right as viewed in FIGS. 2 and 3, by means of a spring 36, which maintains a cam follower ear 37 of the slide plate cam follower arm 38 in contiguous engagement with a cam surface 39 on the lens support member 15. A beam focusing lens 41, is supported on the slide plate 33 in front of the lamp 21, and to the rear of a window 42 located in the camera housing 11, so that when the slide plate 33 is in the position shown in FIG. 2, the pulsating light emitted by the lamp 21 is directed along the axis indicated by the dashed line 43. When latch arm 31 is released from engagement with latch tooth 32 of the lens support member 15, the resulting counterclockwise rotation of the cam surface 39 of the lens support member 15 permits spring 36 (FIG. 2) to move the slide plate 33 and lens 41 to the right, so that the beam of light is swept successively through an angular displacement to the position represented by dashed line 44.

A stationary lens 45 (FIG. 2) supported behind a window 46 (FIG. 1) positioned in the camera housing has an optical axis indicated by the dashed line 47, which is parallel to the optical axis of objective lens 14, and approximately at the center of the field of view of viewfinder 48 (FIG. 1). Lens 45 has a relatively narrow optical field, and is located in alignment with a photocell 49, so that light reflected toward the camera from an object located along lens axis 47 is focused on the photocell 49. Accordingly, it will be appreciated that the coordination provided by cam surface 39 between the lateral movement of lens 41 and the focusing movement of the objective lens 14, enables the photocell 49 to be illuminated by pulsating light initially beamed from a lamp 21 and reflected from a subject located along lens axis 47, when the subject is being simultaneously focused upon by the objective lens 14. For illustrative purposes only, in FIG. 2, the light beams axes 43, 47 and the axis of lens 41 have been shown greatly foreshortened, but it should be appreciated that the intersection point designated by X represents the nearest focal adjustment of the objective lens 14, while the intersection point designated by Y represents the distance to the nearest object that can be focused within the hyperfocal range of the lens 14 when the latter is adjusted to its maximum aperture. In other words, considering objective lens 14 to have the same characteristics as in the previously described examples, point X represents a distance of about 4 feet, and point Y represents a distance of about 39 feet.

When the point of intersection of the light beam with the axis of lens 45 coincides with an object located along its axis, the resulting illumination of photocell 49 by the reflected light from lamp 21 produces a pulsating or alternating electrical response at the frequency of the pulsated light source which is amplified by an amplifier unit 51, the latter also being connected to the battery 19 whenever switch 23 is closed. The amplifier 51 includes, as will be understood to those skilled in the art, a conventional high pass filter network centered on the frequency of the pulsed light source to prevent actuation of the solenoid 52 by spurring signals produced by the photocell from ambient lighting and light sources at other frequencies. The amplified output of the amplifier unit 51 energizes a solenoid 52 (FIGS. 2 and 3) to pivot dog member 53 into engagement with the circumferential teeth 54 on the lens support member 15 thereby arresting further counterclockwise displacement so that the lens 14 remains in focus on the object. If no object is detected along the axis of lens 45 between points X and Y, the focusing movement of objective lens 14 is arrested by the abutment of an ear 55 on the lens support member 15 with the cam follower ear 37 on cam follower arm 38 so that the lens 14 is positioned at its hyperfocal distance setting corresponding to its maximum aperture, i.e. at a setting of infinity. Stated differently, upon failure of the rangefinder mechanism to detect an object closer than about 39 feet, the adjustment of the lens aperture to its smallest opening of f11 will extend the hyperfocal range of the lens 14 down to about 11 feet 6 inches as opposed to its maximum hyperfocal range at which all objects beyond about 5 feet 10 inches would be in sharp focus.

Referring now to FIG. 3 of the drawings, the automatic exposure regulating means of the illustrative camera will be seen to include another photocell 56 supported behind a window 57 (FIG. 1) in the camera housing 11 and directed toward the scene to be photographed. As in many such systems, photocell 56, is connected to a galvanometer 58, so that galvanometer needle 59 formed from a flexible material moves progressively further to the right above an anvil member 61 in response to progressively higher levels of scene brightness. The needle 59 includes a free end portion which extends beyond the top surface of the anvil member 61. The exposure regulating means includes a needle trapping member 62 which is supported for slidable displacement above and slightly forward of the anvil member 61 by means of a biasing spring 65, by a pair of support studs 63 extending through an elongate slot 64. A slightly stronger spring 66 connects the needle trapping member 62 to an arm 67 of shutter operating member 13, so that it is normally maintained in the raised position depicted in FIG. 3. When the shutter operating member 13 is manually depressed however, spring 66 pulls the needle trapping member 62 downward against the opposing force of the spring 65. A stepped needle trapping surface 68 at the lower end of the needle trapping member 62 is adapted to trap or engage the flexible galvanometer needle 59 against anvil member 61, and thereby limit downward movement of member 62 as a function of scene brightness, whereupon the shutter operating member 13 continues its downward movement elongating spring 66. Thus, the distance by which needle traping member 62 moves downwardly before being blocked by the galvanometer needle 59 decreases as a function of increasing levels of scene brightness.

A pair of similar diaphragm blades 69 and 71, are pivotally supported by stud 72, and are biased toward each other by a light spring 73 to maintain their respective cam edge surfaces 74 and 75 in contact with opposite sides of a control pin 76 carried by arm 77 of needle trapping member 62. As the needle trapping member 62 moves downwardly, the corresponding downward movement of pin 76 causes the diaphragm blades 69, 71 to be pivoted outwardly under discipline of spring 73, so that the respective overlapping notches 78 and 79 at the lower ends of the blades move symmetrically away from the lens axis to enlarge the size of the square lens aperture defined thereby. In this manner, the size of the objective lens aperture is properly related to the position of the blocked needle trapping member 62 as a function of scene brightness.

Figure 4:
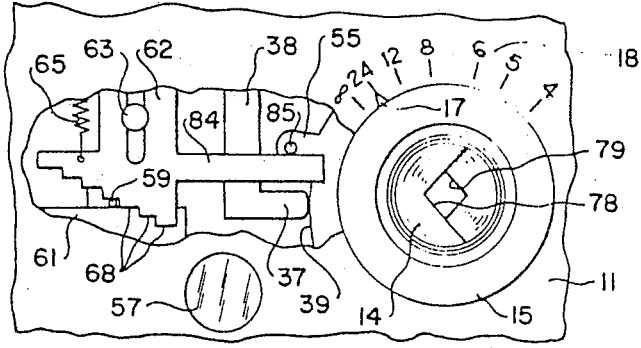
FIG. 4 is a fragmentary front view of the camera depicted in FIGS. 1-3 showing the adjustment of the camera lens to a hyperfocal position established by the concurrent adjustment of the camera lens aperture to a relatively small opening.
Figure 5:
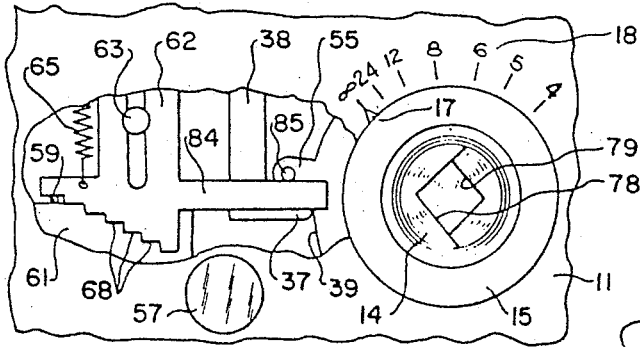
FIG. 5 is a similar fragmentary front view of the camera depicted in FIGS. 1-3 showing the adjustment of the camera lens to a hyperfocal position established by the concurrent adjustment of the camera lens aperture to its largest opening.

After the objective lens 14 has been adjusted, the continuing downward movement of the shutter operating member 13 brings its lower arm 81 into contact with latch arm 31, which against the yielding opposition of spring 83, pivots about its support stud 82, disengaging from latch ear 32. As soon as such disengagement occurs, the lens support member 15 is rotated in a counterclockwise direction by spring 29. In accordance with the present invention, however, the hyperfocal position assumed by the objective lens if the rangefinder system fails to detect an object at a closer range is not necessarily determined by the abutment of lens support member ear 55 against ear 37 of the slide plate, instead, the focus coordinating arm member 84 extends laterally from the needle trapping member 62 into the path of movement of projecting pin 85 on lens support member ear 55, arresting or blocking its rotational displacement to establish the hyperfocal setting of the objective lens 14 in accordance with the adjusted size of the lens aperture. For example, in FIG. 4, the depicted position of the galvanometer needle 59 representing an intermediate level of scene brightness, has caused the needle trapping member 62 to adjust the lens aperture to an opening which, for illustrative purposes, will be considered to be f5.6. Accordingly, focus coordinating arm 84 is located at a position at which it will block movement of the objective lens support member 15 at the distance setting yielding the greatest hyperfocal depth of field available at that aperture setting, namely a distance setting of about 24 feet. Similarly, under conditions of higher or lower levels of scene brightness, the position of the focus adjusting arm establishes closer or more distant hyperfocal settings of the objective lens correspondingly related to the corresponding aperture adjustment. Therefore, as illustrated in FIG. 5, the objective lens will be adjusted to its most distant hyperfocal distance setting only when the existence of relatively low scene brightness causes the lens aperture to be adjusted to its maximum opening, and the focus coordinating arm 84 to be located below the lowermost range of movement of pin 85 established by the abutment of ears 55 and 37.

Upon completion of the focusing adjustment of the objective lens 14, further displacement of shutter operating member 13 pivots the free end of latch release arm 31 into engagement with shutter trigger lever 86 to operate the camera shutter, not shown.

While the foregoing description specifically relates to the utilization of the present invention in conjunction with particular types of automatic camera focusing and exposure regulating systems, it will be apparent that the invention is equally applicable to both still cameras and motion picture cameras employing other versions of such systems, as well as to cameras in which either or both of those functions are performed manually. Furthermore, it should be recognized that the invention is not limited to adjusting a camera objective lens only to different hyperfocal settings, but could be employed also to provide similar lens focusing adjustments at closer distance ranges in accordance with lens aperture settings and predetermined depth of field criteria.

The invention has been described with particular reference to a preferred embodiment thereof, but it will be understood that variations and modifications can be effected within the spirit and scope of the invention.

I claim:
1. In a camera comprising:
 (a) an objective lens adapted to form an image of an object in a primary image plane;
 (b) movable focusing means coupled to said objective lens for moving said objective lens along a predetermined path to focus the image of the object in the plane; and
 (c) exposure regulating means including photoresponsive means responsive to scene brightness for adjusting the size of an exposure aperture aligned with said objective lens as a function of scene brightness, hyperfocal distance setting means comprising:
 (d) means coupled to said exposure regulating means and including a member movable as a function of the adjusted size of the aperture to a position wherein it is adapted to be engaged by said focusing means for limiting movement of said focusing means to a hyperfocal position of said objective lens.

2. In a camera including:
(a) an objective lens adapted to form an image of an object in a primary image plane;
(b) objective lens support means supporting said objective lens for forward and rearward focusing movement along its optical axis in relation to the object;
(c) an automatic rangefinder adapted to determine the distance from said camera to the object and to move said objective lens automatically to a position wherein the image of the object is focused in the plane;
(d) means defining an exposure aperture aligned with the objective lens and being movable to vary the size of said aperture; and
(e) exposure control means for moving said aperture size varying means to adjust the size of said aperture as a function of scene brightness, the improvement comprising:
(f) blocking means responsive to movement of said aperture size varying means and adapted to engage said lens support means for limiting the rearward movement of said objective lens at a hyperfocal distance setting which is a function of the adjusted size of said aperture.

3. A camera according to claim 2 in which said exposure control means includes:
(a) a photocell having a parameter which varies as a function of scene brightness;
(b) a galvanometer coupled to said photocell and having a needle adapted to assume a position corresponding to scene brightness detected by said photocell; and
(c) a needle trapping member adapted to engage said needle and to be blocked thereby at a location functionally related to scene brightness, said blocking means comprising:
(d) a first abutment member carried by said lens support means and movable therewith along a predetermined movement path; and
(e) a second abutment member connected to and movable by said needle trapping member along said predetermined path of movement of said first abutment member to limit rearward movement of said lens support means in accordance with the location of said needle trapping member engaged with said needle.

4. In a camera, the combination comprising:
(a) an objective lens adapted to form an image of an object in a primary image plane;
(b) automatic focusing means adapted to move said objective lens along a predetermined path to a position to focus the image of the object of the plane;
(c) movable exposure regulating means defining an adjustable exposure aperture aligned with said objective lens;
(d) means for adjusting the size of said aperture as a function of the intensity of scene illumination; and
(e) means adapted to be coupled to said automatic focusing means for varying the range of movement of said objective lens along the path as a function of the adjusted size of said aperture.

5. In a camera having an objective lens adapted to form an image of an object in a primary image plane, automatic focusing means adapted to move said objective lens along a predetermined path to a position to focus the image of the object in the plane, and movable exposure regulating means defining an exposure aperture aligned with said objective lens and having means movable in response to variations in the intensity of scene illumination to adjust the size of said aperture, hyperfocal distance setting means comprising a member movable to a position corresponding to the hyperfocal distance setting in response to the adjusted aperture size and being adapted to engage said automatic focusing means to permit said automatic focusing means to position said objective lens at the hyperfocal distance setting when the object is disposed beyond the hyperfocal distance.

References Cited
UNITED STATES PATENTS

| | | | |
|---|---|---|---|
| 3,274,914 | 9/1966 | Biedermann et al. | 95—44 |
| 3,418,908 | 12/1968 | Land | 95—45 |
| 3,464,333 | 9/1969 | Aoki et al. | 95—44 X |

SAMUEL S. MATTHEWS, Primary Examiner

R. L. MOSES, Assistant Examiner

U.S. Cl. X.R.

95—44 C; 352—140